F. T. SWANSON.
SPRING SUSPENSION FOR MOTOR VEHICLES.
APPLICATION FILED FEB. 20, 1919.
1,315,052.  Patented Sept. 2, 1919.
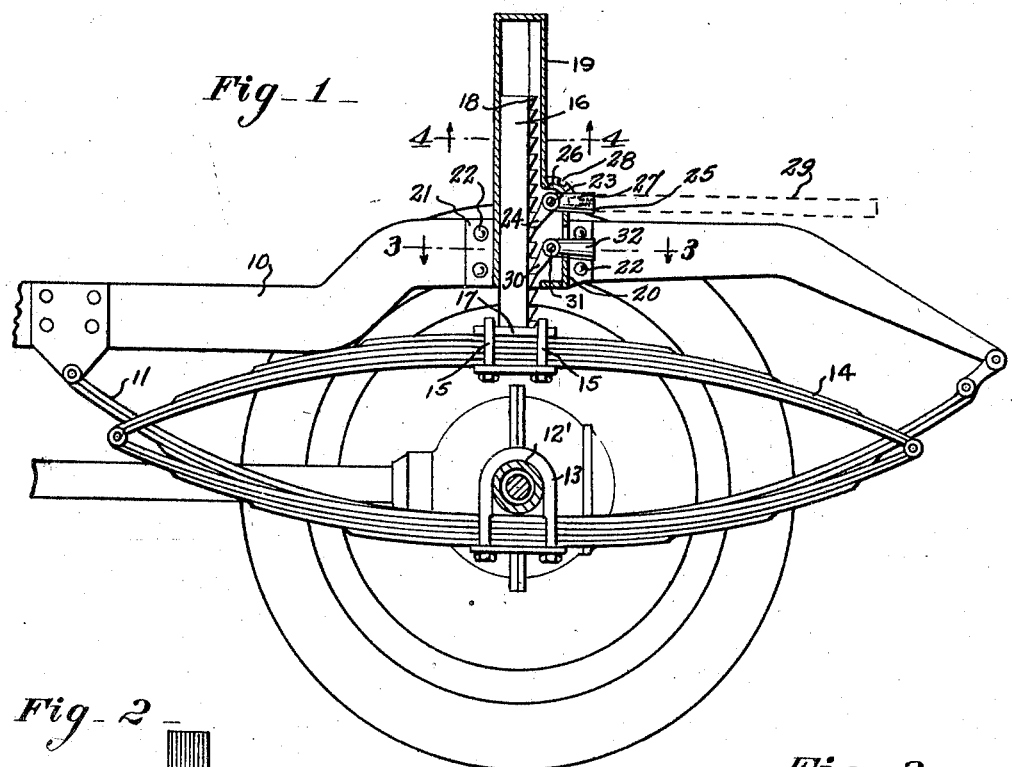
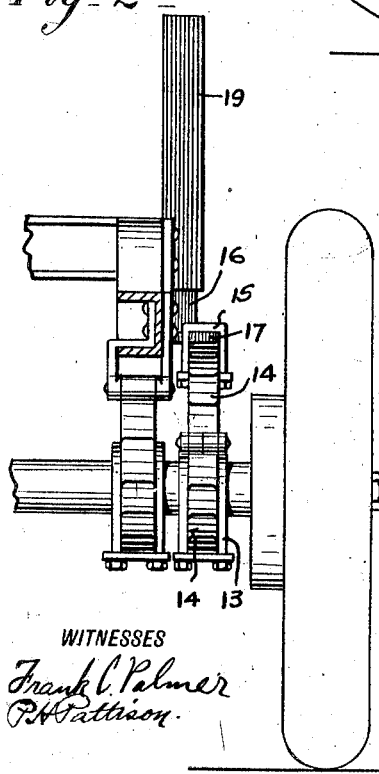
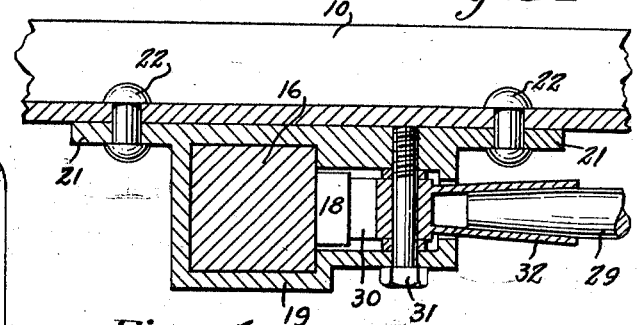
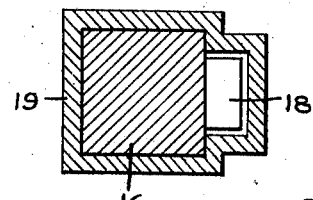
WITNESSES
Frank C. Palmer
P. H. Pattison
INVENTOR
Frank T. Swanson,
BY Mmmlea
ATTORNEYS
THE COLUMBIA PLANOGRAPH CO., WASHINGTON, D. C.

UNITED STATES PATENT OFFICE.

FRANK THOMAS SWANSON, OF HAYWARD, CALIFORNIA.

SPRING SUSPENSION FOR MOTOR-VEHICLES.

1,315,052.  Specification of Letters Patent.  Patented Sept. 2, 1919.

Application filed February 20, 1919. Serial No. 278,151.

*To all whom it may concern:*

Be it known that I, FRANK T. SWANSON, a citizen of the United States, and a resident of Hayward, in the county of Alameda and State of California, have invented a new and Improved Spring Suspension for Motor-Vehicles, of which the following is a full, clear, and exact description.

This invention relates to motor vehicles and pertains more particularly to a method of spring suspension therefor.

It is one of the several objects of the invention to provide an auxiliary spring for motor vehicles.

It is a further object of the present invention to construct this auxiliary spring in such a manner that it is not operative unless the load of the motor vehicle is too great for the ordinary spring suspension thereof.

A still further object of the invention is to provide an additional spring in which the tension thereof may be regulated by the weight of the load of the motor vehicle.

A still further object of the invention is to so construct an auxiliary spring that its tension may be set automatically or manually by the operator of the motor vehicle.

Reference is to be had to the accompanying drawings forming a part of this specification in which like characters of reference indicate corresponding parts in all the figures, and in which—

Figure 1 is a side elevation partly in section of the rear construction of a motor vehicle with my improvement attached;

Fig. 2 is an end view thereof, partly in section;

Fig. 3 is a section on the line 3—3 in Fig. 1;

Fig. 4 is a section on the line 4—4 in Fig. 1;

Referring more particularly to the drawings, the reference character 10 designates one of the frame members of a motor vehicle chassis, and the reference character 11 designates the ordinary or conventional form of spring suspension therefor. The reference character 12 designates the rear axle housing, and secured to said housing, by means of a clip 13, or the like, is a spring 14. This spring may be of any desired type known to the art, the elliptical form being used merely for the purpose of illustration.

Secured to the top half of the elliptical spring 14, by means of clips or shackles 15, is a rigid toothed member 16, said member projecting from a base 17, which forms the means by which it is secured in place. This rigid member 16 is provided on one of its edges, with a plurality of projecting teeth 18, the length of said teeth being less than the transverse dimension of the member 16.

Secured to the side member 10 of the frame or chassis, is a housing 19, the lower part of which is enlarged as at 20, and is provided with oppositely disposed flanges 21. These flanges 21, in combination with suitable rivets or the like 22, form the means by which the housing is secured in place on the side member 10.

Pivotally mounted in the enlarged portion 20 of the housing 19, as at 23, is a pawl or the like, 24, the outer end of which is in the form of a socketed member 25, and projects through a slot 26 in the enlarged portion 20. Carried by the socketed member 25, is a spring bolt 27, which is adapted to engage in a notch 28, when the pawl 25 is disengaged with the teeth 18 of the toothed member 16. A handle 29 is adapted to be received within the socketed member 25 and forms the means by which the pawl 24 is operated in a manner to be hereinafter described.

Mounted in the enlarged portion 20 of the housing 19, below the pawl 24, is a second pawl 30, said second-mentioned pawl being pivoted as at 31. This pawl is likewise provided with a socketed member 32, in which the handle 29 is adapted to be inserted to operate said pawl.

Having thus described the invention, the operation is as follows: Under normal conditions, the pawls 25 and 30 are disengaged with the teeth 18 of the toothed member 16, thus permitting free movement of said toothed member 16 within the housing 19. If, however, excessive load is placed on the body of the motor vehicle, the pawls 25 and 30 will be engaged with the teeth 18 of the toothed member 16, and as the load is placed upon the motor vehicle, the spring 14 will be placed under compression and will serve to partially relieve the strain on the spring 11.

In lieu of the above described operation, the compression under which the spring 14 is placed may be accomplished automatically in the following manner: If the pawls 24 and 30 are left to freely engage the toothed member 16, it will be seen that any strain due to irregularities in the surface over which the motor vehicle is traveling, will be communicated to the spring 14 and said spring will respond by compression thereof. Upon the rebounding action of the body, the housing 19 will be moved longitudinally upwardly of the toothed member 16, the pawls 24 and 30 being free to successively engage the teeth 18 of said toothed member. When the rebounding action of the body has been suspended, it is apparent that the spring 14 will be placed under greater compression than before said action took place. In this manner it will be seen that the action of compressing the spring 14 is automatically accomplished.

From the foregoing description, it will be seen that the present invention provides means whereby a motor vehicle may be operated on the spring suspension originally intended therefor, and, at the same time, the motor vehicle may be made to carry loads in xcess of those intended for the original spring suspension thereof without in any manner injuring the latter.

Having thus described the invention, what is claimed is:

1. A device of the character described comprising a spring secured to the axle of a motor vehicle; a rigid member projecting from said spring; a housing adapted to receive said rigid member; and means carried by said housing for engagement with the rigid member to maintain said spring under compression.

2. A device of the character described comprising a spring secured to the axle of a motor vehicle; a toothed member projecting vertically from said spring; a housing carried by the frame of the motor vehicle and adapted to receive said toothed member; and means carried by said housing and adapted for engagement with said toothed member for maintaining said spring under compression.

3. A device of the character described comprising a spring carried by the axle of a motor vehicle; a rigid toothed member carried by said spring; a housing carried by the frame of the motor vehicle and adapted to receive said rigid toothed member; a plurality of pawls adapted for engagement with the toothed member to maintain said spring under compression; and means for maintaining said pawls out of engagement with said toothed member.

4. A device of the character described comprising in combination with the spring suspension of a motor vehicle; an auxiliary spring; and means independent of said spring suspension for maintaining said auxiliary spring under compression.

5. A device of the character described comprising an auxiliary spring; and means for automatically placing the auxiliary spring under compression, said means also serving to maintain the compression of said spring.

6. A device of the character described comprising in combination with the spring suspension of a road vehicle, an auxiliary spring, a rigid member projecting from said auxiliary spring, and means carried by the frame of said vehicle and adapted for engagement with said rigid member to maintain said auxiliary spring under compression.

7. In a spring suspension for vehicles, a spring, and means carried by the body of said vehicle for placing said spring under compression upon movement of the body relatively to the spring, said means further serving to maintain said spring under compression.

8. In a spring suspension for vehicles, a spring, means carried by the body of the vehicle for placing said spring under compression upon movement of the body relatively to the spring, and means for maintaining said spring under compression.

FRANK THOMAS SWANSON.

Witness:
E. S. WARREN.

Copies of this patent may be obtained for five cents each, by addressing the "Commissioner of Patents, Washington, D. C."